US012467044B2

(12) United States Patent
Wang

(10) Patent No.: US 12,467,044 B2
(45) Date of Patent: Nov. 11, 2025

(54) MUTANT AMINOACYL tRNA SYNTHETASE

(71) Applicant: The Regents of the University of California, Oakland, CA (US)

(72) Inventor: Lei Wang, San Francisco, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 78 days.

(21) Appl. No.: 17/818,919

(22) Filed: Aug. 10, 2022

(65) Prior Publication Data
US 2022/0411778 A1 Dec. 29, 2022

Related U.S. Application Data

(63) Continuation of application No. 16/484,757, filed as application No. PCT/US2018/018063 on Feb. 13, 2018, now Pat. No. 11,447,764.

(60) Provisional application No. 62/458,557, filed on Feb. 13, 2017.

(51) Int. Cl.
| C12N 9/88 | (2006.01) |
| C07F 9/12 | (2006.01) |
| C07F 9/24 | (2006.01) |
| C12N 9/00 | (2006.01) |
| C12N 15/52 | (2006.01) |
| C12N 15/63 | (2006.01) |

(52) U.S. Cl.
CPC ............... *C12N 9/88* (2013.01); *C07F 9/12* (2013.01); *C07F 9/242* (2013.01); *C12N 9/93* (2013.01); *C12N 15/52* (2013.01); *C12N 15/63* (2013.01); *C12N 2310/314* (2013.01); *C12Y 601/01026* (2013.01)

(58) Field of Classification Search
CPC . C12N 9/88; C12N 9/93; C12N 15/52; C12N 15/63; C12N 2310/314; C07F 9/12; C07F 9/242; C12Y 601/01026
See application file for complete search history.

(56) References Cited

U.S. PATENT DOCUMENTS 9,085,514 B2  7/2015 Lemke et al.

FOREIGN PATENT DOCUMENTS

WO  2001/74827 A1  10/2001
WO  2015/006555 A2  1/2015

OTHER PUBLICATIONS

Arslan, T., et al., "Structurally modified firefly luciferase." Effects of amino acid substitution at position 286, Journal of the American Chemical Society, 1997, vol. 119, No. 45, pp. 10877-10887. See abstract; pp. 10878-10880, 10886; and schemes 3, 4. Published Nov. 12, 1997.

Chao, H.-G. et al., "Synthesis and application of Fmoc-G-[bis 20-22,26,27 (dimethylamino) phosphono] tyrosine, a versatile protected phosphotyrosine equivalent," The Journal of Organic Chemistry, 1995, vol. 60, pp. 7710-7711. See p. 7710; scheme 1; and tables 1,2. Published 1995.

Rothman, D. M. et al., "Caged phosphoproteins" Journal of the American Chemical Society, 2005, vol. 127, No. 3. pp. 846-847 See p. 846: and scheme 2. Published 2005.

Humphrey. D. eta!., "In situ photoactivation of a caged phosphotyrosine peptide derived from focal adhesion kinase temporarily halts lamellar extension of single migrating tumor cells", Journal of Biological Chemistry, 2005, vol. 280, No. 23, pp. 22091-22101 See abstract: p. 22095: and figure 1. Published Apr. 6, 2005.

Chen, S. et al.. "Incorporation of Phosphorylated Tyrosine into Proteins: In Vitro Translation and Study of Phosphorylated I KB-u and Its Interaction with NF-KB" Journal of the American Chemical Society, 2017, vol. 139, pp. 14098-14108. [Epub.]Sep. 12, 2017 See abstract: pp. 14099-14100. 14104-14106: and figure 1. Published Sep. 12, 2017.

Hoppmann et al., 2014 Genetically Encoding Photoswitchable Click Amino Acids in *Escherichia coli* and Mammalian Cells. Angew. Chem. Int. Ed. Engl. 53, 3932-3936. Published Apr. 7, 2014.

Lacey et al., 2015, Expanding the Library and Substrate Diversity of the Pyrrolysyl-tRNA Synthetase to Incorporate Unnatural Amino Acids Containing Conjugated Rings Chembiochem 14: 2100-2105. Published Nov. 4, 2013.

*Primary Examiner* — Iqbal H Chowdhury
(74) *Attorney, Agent, or Firm* — MARSHALL, GERSTEIN & BORUN LLP

(57) ABSTRACT

Provided herein are novel materials and methods for site-specific incorporation of phosphotyrosines into proteins. The novel methods of the invention encompass the use of a novel aminoacyl tRNA synthetase capable of charging compatible tRNAs with a phosphotyrosine precursor. The phosphotyrosine precursor is then incorporated, site-specifically, into a protein at sites where phosphotyrosine residues are desired. The phosphotyrosine precursors are subsequently treated to convert them into phosphotyrosine residues, yielding proteins with phosphotyrosines at selected sites. The scope of the invention encompasses novel aminoacyl tRNA synthetases, novel phosphotyrosine precursors, and methods of using these materials to create site-specific phosphorylated tyrosine residues in a protein.

5 Claims, 4 Drawing Sheets

Specification includes a Sequence Listing.

MUTANT AMINOACYL tRNA SYNTHETASE

CROSS-REFERENCE TO RELATED APPLICATIONS

This application is a continuation application of U.S. patent application Ser. No. 16/484,757, filed Aug. 8, 2019, entitled "Site-Specific Generation of Phosphorylated Tyrosines in Proteins," which is a 35 USC § 371 national stage application of International Patent Application Number PCT/US2018/018063, filed Feb. 13, 2018, entitled "Site-Specific Generation of Phosphorylated Tyrosines in Proteins," which claims the benefit of priority to U.S. Provisional Application Ser. No. 62/458,557, entitled "Site-Specific Generation of Phosphorylated Tyrosines in Proteins," filed Feb. 13, 2017, the contents which applications are hereby incorporated by reference.

STATEMENT REGARDING FEDERALLY SPONSORED RESEARCH OR DEVELOPMENT

This invention was made with government support under grant no. R01 GM118384, awarded by the National Institutes of Health. The government has certain rights in the invention.

REFERENCE TO SEQUENCE LISTING, A TABLE, OR A COMPUTER PROGRAM LISTING COMPACT DISK APPENDIX

The instant application contains a Sequence Listing which has been filed electronically in XML format and is hereby incorporated by reference in its entirety. Said XML copy, created on Aug. 5, 2022, is named \SL-UCSF039C1.xml and is 6,961 bytes in size.

BACKGROUND OF THE INVENTION

Protein phosphorylation is a major post-translational modification that plays a pivotal role for signal transduction and in regulating cellular events. In particular, phosphorylation of tyrosine is involved in many processes including cell proliferation, cell cycle progression, metabolic homeostasis, transcriptional activation, neural transmission, differentiation and development, and aging. Conversely, dysfunction of tyrosine phosphorylation results in various diseases, most prominently in cancer. The limited access to site-specifically phosphorylated proteins hampers the investigation of this major post-translational modification in disease-relevant proteins. Many methods have been developed to prepare and study tyrosine phosphorylated proteins. The most generally useful approach has been the substitution of negatively charged glutamate or aspartate in place of phosphoserine or phosphothreonine modifications, despite the charge difference between the carboxylate and phosphate mono-ester. Mimics of the aromatic phosphotyrosine however are particularly challenging since there are no aromatic negatively charged residues in the natural 20 amino acids. Proteins can be phosphorylated by employing tyrosine kinases, but in vitro kinase phosphorylation has limited site specificity, and often results in less than stoichiometric phosphorylation.

To overcome this limitation, chemical approaches including native chemical ligation, semisynthetic and cell-free methods have been developed to introduce phosphotyrosine site-selectively, yet these methods are technically challenging and cannot be generally applied to all proteins. Through the expansion of the genetic code, chemical analogues of phosphotyrosine were selectively incorporated into proteins in *E. coli*, yet these analogues cannot faithfully mimic the phosphate group and its negative charges. Another phosphorylated amino acid, phosphoserine, has recently been genetically incorporated into proteins in *E. coli*, although the expressed protein has low yields and low quality due to codon skipping. In spite of extensive efforts to satisfy the high demand for pure phosphorylated proteins for investigating phosphorylation, to date, there is no general, efficient system available to prepare proteins with native phosphotyrosine introduced site-specifically.

Accordingly, there remains a need in the art for efficient and simple methods of producing proteins with site-specific phosphorylated tyrosines.

SUMMARY OF THE INVENTION

Provided herein are novel materials and methods for site-specific incorporation of phosphotyrosines into proteins. The methods of the invention encompass the use of a novel aminoacyl tRNA synthetase capable of charging certain tRNAs with a phosphotyrosine precursor. The phosphotyrosine precursor is then incorporated, site-specifically, into a protein at sites where phosphotyrosine residues are desired. The phosphotyrosine precursors are subsequently treated to convert them into phosphotyrosine residues, yielding proteins with phosphotyrosines at selected sites. The scope of the invention encompasses novel aminoacyl tRNA synthetases, novel phosphotyrosine precursors, and methods of using these materials to create site-specific phosphorylated tyrosine residues in a protein.

BRIEF DESCRIPTION OF THE DRAWINGS

FIG. 1 is a schematic presentation of the production of pure tyrosine phosphorylated proteins. Genetic encoding of a phosphotyrosine precursor (Tyr(PO(NMe$_2$)$_2$) into proteins and subsequent deprotection results in formation of a native phosphotyrosine, site-specifically.

FIG. 2 depicts genetic encoding of the phosphotyrosine precursor Tyr(PO(NMe$_2$)$_2$ into calmodulin, acidic cleavage of the protecting group and formation of phosphorylated calmodulin by mild acidic treatment.

FIG. 3 depicts genetic encoding of Tyr(PO(NMe$_2$)$_2$ into GFP, acidic cleavage of the protecting group, and formation of phosphorylated GFP.

FIG. 4 depicts HCl cleavage of the phosphoramidate group in Tyr(PO(NMe$_2$)$_2$ and formation of phosphorylated tyrosine.

DETAILED DESCRIPTION OF THE INVENTION

Figure 1:
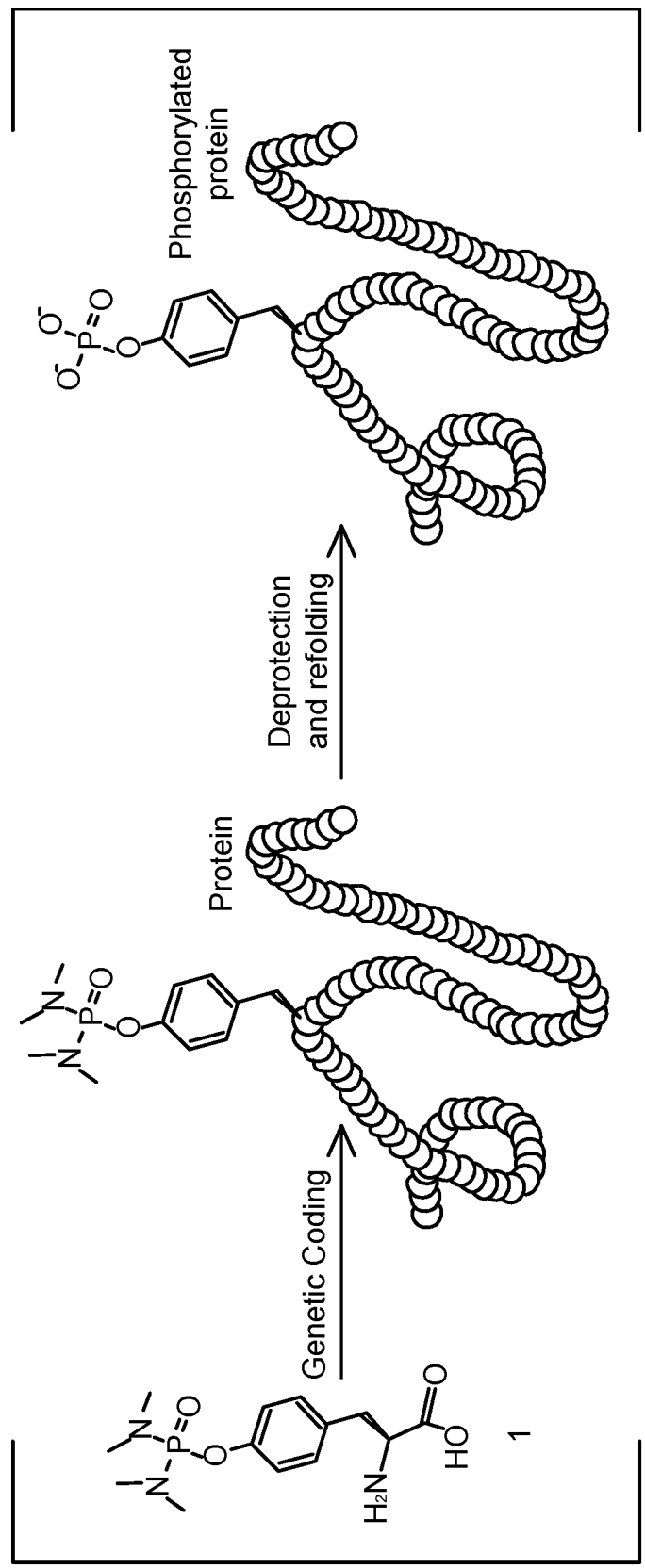
FIG. 1.
Figure 2:
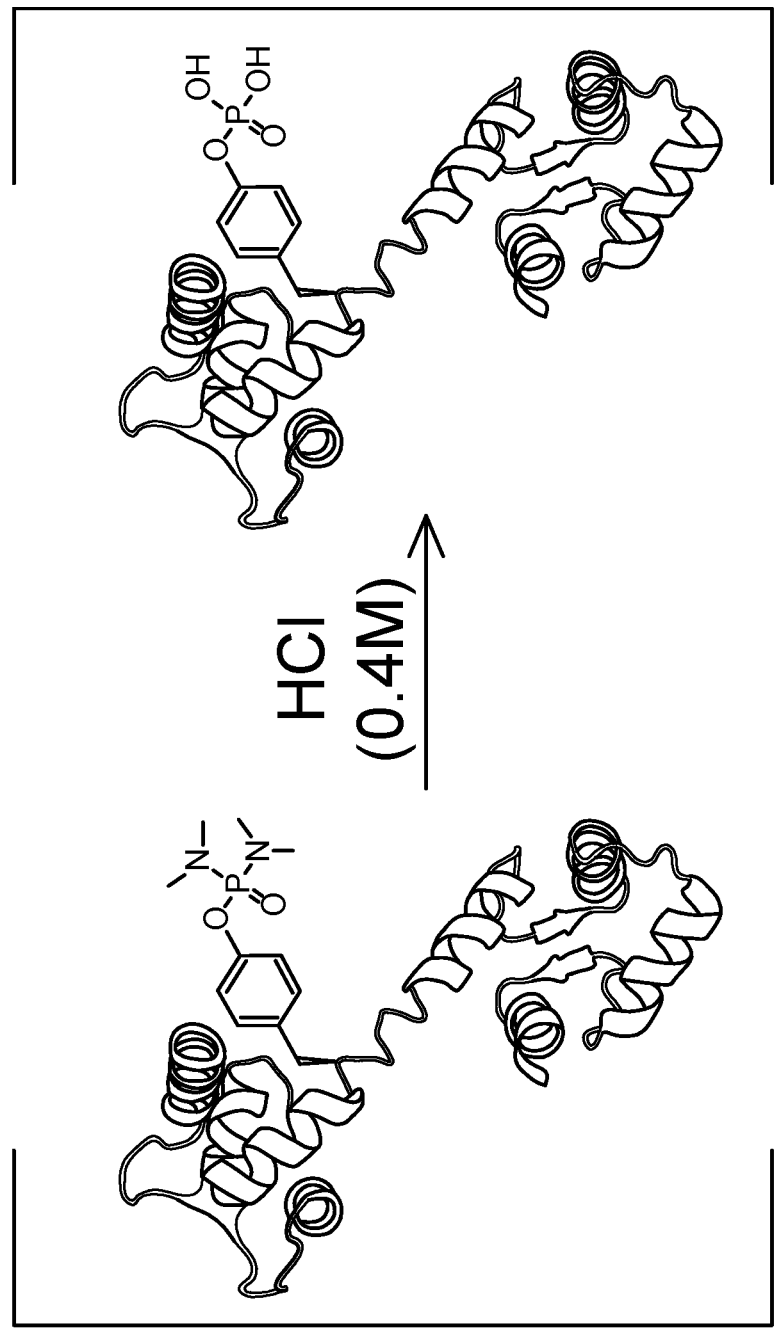
FIG. 2.
Figure 3:
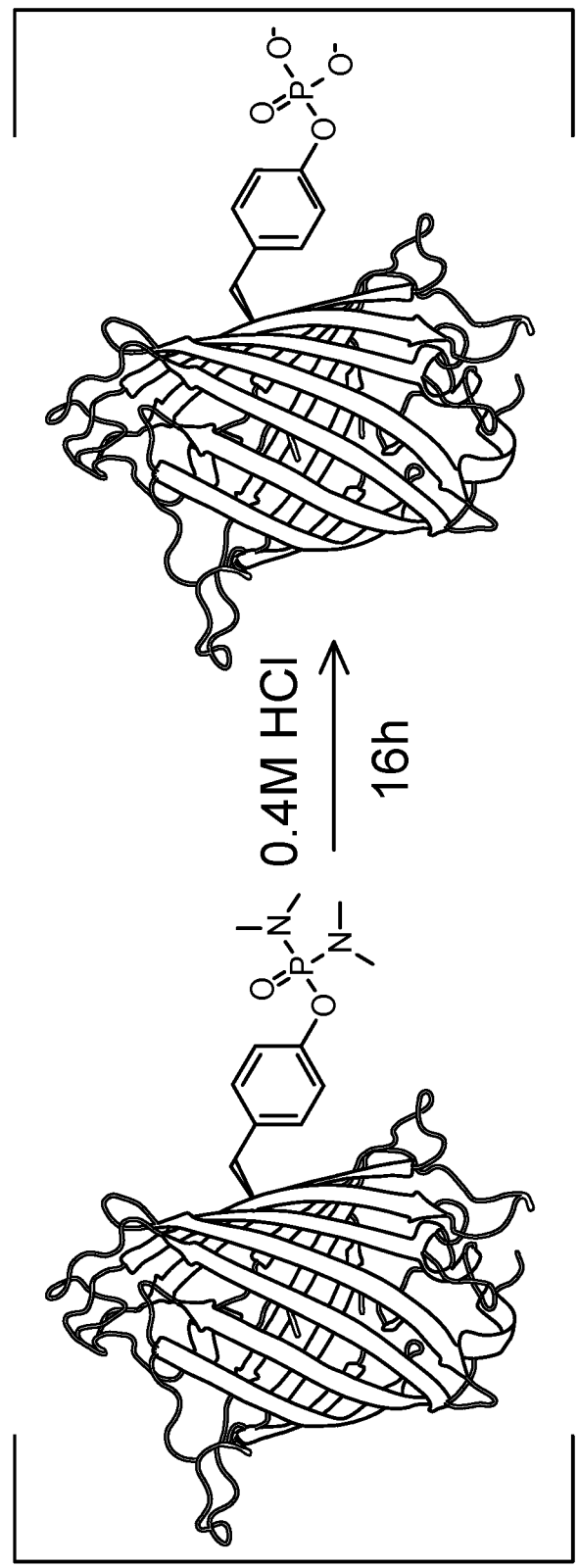
FIG. 3.
Figure 4:
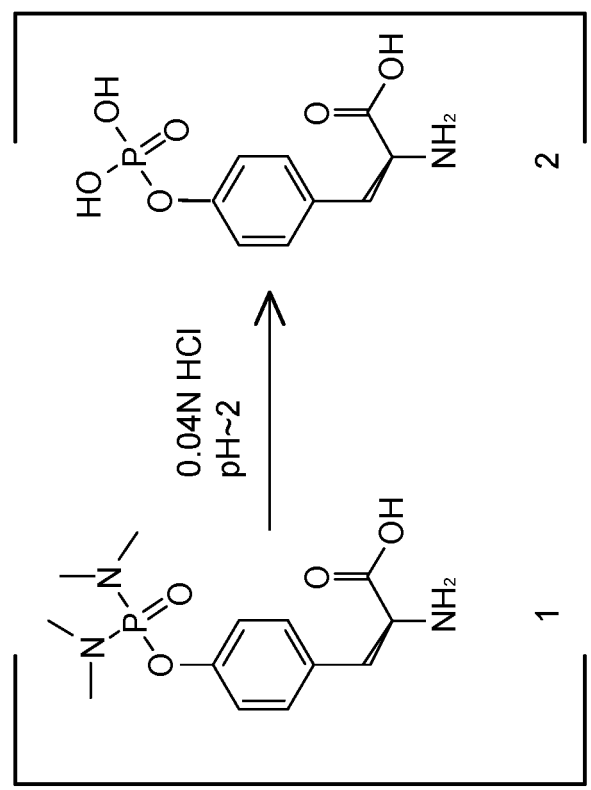
FIG. 4.

The inventions disclosed herein provide the art with novel materials and methods for the facile, site-specific incorporation of phosphorylated tyrosines into proteins. In a general aspect, the scope of the invention encompasses a method of creating proteins with selectively phosphorylated tyrosine residues as follows: a charge-neutral and stable phosphotyrosine analogue is genetically incorporated into proteins at the target phosphorylation site through the expansion of the genetic code, which precursors are subsequently converted into native phosphorylated tyrosines by a mild treatment, such as a facile pH shift.

The general method of the invention utilizes the following elements:

a "phosphorylated tyrosine precursor" that comprises an amino acid that can be converted to a phosphorylated tyrosine upon application of a conversion treatment;

incorporation of the phosphorylated tyrosine precursor into selected sites of a "precursor protein" by use of an expression system;

a "mutant aminoacyl tRNA synthetase" and compatible tRNA, wherein these two elements are capable of incorporating a phosphorylated tryosine precursor into a protein at sites specified by a non-natural codon; and a "conversion treatment" comprising a mild chemical or energetic treatment that converts the phosphorylated tyrosine precursor to a phosphorylated tyrosine.

The general method of the invention encompasses the steps of:

producing a nucleic acid construct that codes for the precursor protein, wherein the nucleic acid construct comprises a non-natural codon at each position wherein a phosphorylated tyrosine precursor is to be included in the precursor protein;

introducing the engineered nucleic acid sequence into an expression system wherein the expression system comprises the mutant aminoacyl tRNA synthetase and compatible tRNA, as well as phosphorylated tyrosine precursors;

inducing the expression system to express the precursor protein, wherein one or more phosphorylated tyrosine precursors are incorporated into the protein at positions specified by the non-natural codon(s);

isolating the expressed precursor protein; and treating the precursor protein with the conversion treatment to convert the one or more phosphorylated tyrosine precursors to phosphorylated tyrosines.

The scope of the invention encompasses various implementations of the aforementioned method, the various elements of which are next described in detail.

Phosphorylated Protein. The objective of the invention is to provide proteins having one or more phosphorylated tyrosine residues. The phosphorylated protein may comprise any protein known in the art, or a fragment thereof, or may encompass artificial polypeptide sequences. Exemplary phosphorylated proteins include growth factors, growth factor receptors, enzymes, transcription factors, and biologically active proteins, e.g., those wherein phosphorylation of tyrosines is implicated in their activity. The basic operation of the invention is to produce a protein with one or more phosphorylated tyrosine residues, at a selected position or positions. In one implementation, the selected protein is a native protein found in vivo that is the target of phosphorylation. The phosphorylation sites may comprise tyrosine residues that are known to be or which are putatively phosphorylated by regulatory kinases in vivo. Alternatively, the phosphorylated tyrosine(s) may be placed at one or more novel positions, for example, comprising tyrosine residues that are not normally phosphorylated or substituting phosphorylated tyrosines for other residues.

Precursor Protein Nucleic Acid Template. The phosphorylated proteins of the invention are formed with the use of a nucleic acid construct coding therefore, wherein the amino acid residues specifying phosphorylated tyrosines are coded by non-natural codons. For example, such sites may comprise the amber codon (TAG), ochre codon (TAA), or umber codon (TGA).

The phosphorylated protein template may be in any nucleic acid form, typically DNA. The phosphorylated protein template may be present in any construct, for example, in a form compatible with use in an expression system. For example, the phosphorylated protein template may comprise a circularized plasmid, a linearized plasmid, or may be stably integrated into the genome of an organism. The construct may comprise any elements required for expression, including promoters, repressor elements, enhancer elements, etc.

The nucleic acid sequence may further code for motifs or elements that will facilitate the isolation and purification of the target protein produced therefrom. For example, in one embodiment, the target protein nucleic acid sequence codes for a terminal HIS tag, for example a 6× HIS tag.

Phosphorylated Tyrosine Precursor. One element of the invention is the use of a non-natural amino acid comprising a phosphorylated tyrosine precursor. The non-natural amino acid will comprise an amino acid with structure:

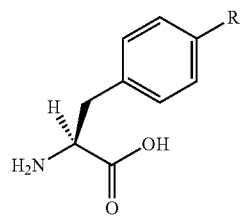

The amino acid will have the following properties: A first property of the amino acid is that R will be neutral, having no charge, or a small charge, e.g. a net negative charge of −1 or less. Phosphorylated tyrosine has two negative charges and its diffusion across the cell membrane is not energetically favorable, making it hard to attain sufficient intracellular concentrations for protein translation therewith. Accordingly, the phosphorylated tyrosine precursors of the invention comprises a neutral species which efficiently diffuses into cells, for example cells used in an expression system as described below.

A second property is that the amino acid will be resistant to phosphatases, which are ubiquitous within the cell. Phosphorylated tyrosine itself is vulnerable to phosphatase activity and does not persist in the cellular environment. The phosphorylated tryosine precursor amino acids of the invention, in contrast, will comprise species that are not acted upon by phosphatases.

A third property of the phosphorylated tryosine precursor amino acid is that it is elongation competent. Phosphorylated tyrosine itself does not efficiently incorporate into proteins by the cellular translation machinery due to the presence of the negatively charged functional group. In contrast, the phosphorylated tryosine precursor amino acids of the invention comprise species which are compatible with the translation machinery of organisms such as $E.\ coli$ and other expression vectors.

A fourth property of the amino acid is that it can be converted into a phosphorylated tyrosine by a chemical or energetic treatment under mild conditions. "Mild conditions," as used herein, means conditions which do not substantially alter the protein's composition or disrupt proper folding of the protein. For example, in one embodiment, the treatment is a mild acid treatment. as described below.

The R group may comprise any species which can be converted to a phosphoric acid group under selected conditions. In one embodiment, the R group comprises a species that can be modified in a chemical reaction with one or more reactants under mild conditions to produce a phosphoric acid group. In one embodiment, the R group comprises a phosphoramidate group. For example, the phosphorylated tyrosine precursor may comprise the amino acid (S)-3-(4(bis(dimethylamino)phosphoryloxy) phenyl)propanoic acid (Tyr(PO(NMe$_2$)$_2$):

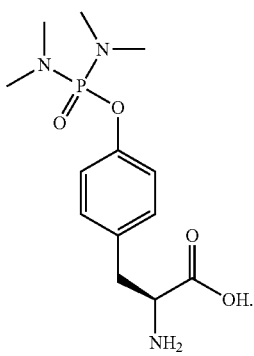 [SMILES: CN(C)P(=O)(Oc1ccc(C[C@H](N)C(=O)O)cc1)N(C)C]

In another implementation, the R group comprises a protecting group that is subsequently cleaved or degraded to reveal or produce a phosphoric acid group, for example by exposure to light. In one embodiment, the phosphorylated tyrosine precursor comprises light-cleavable o-nitrobenzyl groups. For example, in one embodiment, the phosphorylated tyrosine precursor comprises the amino acid (S)-4-(2-amino-2-carboxyethyl)phenyl 2-nitrobenzyl phosphate:

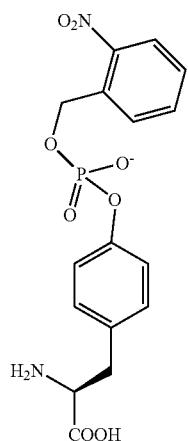 [SMILES: N[C@@H](Cc1ccc(OP(=O)([O-])OCc2ccccc2[N+](=O)[O-])cc1)C(=O)O]

In another embodiment, the amino acid comprises (S)-4-(2-amino-2-carboxyethyl)phenyl 4,5-dimethoxy-2-nitrobenzyl phosphate:

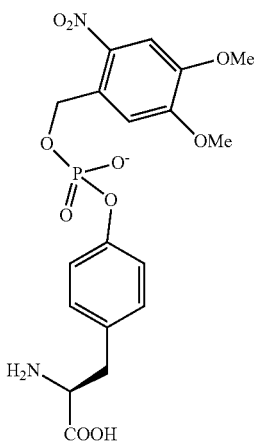 [SMILES: COc1cc(COP(=O)([O-])Oc2ccc(C[C@H](N)C(=O)O)cc2)c([N+](=O)[O-])cc1OC]

In another embodiment, the R group comprises a species that can be substituted with a phosphoric acid group under mild conditions.

Mutant Aminoacyl tRNA synthetase. The invention encompasses the use of an engineered expression system that can site-specifically incorporate a phosphorylated tyrosine precursor into a protein. The expression system will comprise (a) a tRNA which can be charged with the phosphorylated tyrosine precursor and which will recognize a non-natural codon; and (b) an engineered aminoacyl tRNA synthetase which is capable of charging the tRNA with the phosphorylated tyrosine precursor.

In one embodiment, the aminoacyl tRNA synthetase is a mutant form of the *Methanosarcina mazei* pyrrolysyl-tRNA synthetase, as known in the art, for example, as specified by Uniprot Accession Numbers Q8PWY1, A0A0E3WPC9 A0A0E3RZQ6, A0A0E3PZI8, A0A0E3LT83, A0A0E3RUJ0, A0A0F8GPG2, A0A0F8JXW8, or A0A0F8HMA4.

In one embodiment, the mutant is a *Methanosarcina mazei* pyrrolysyl-tRNA synthetase (or variant thereof) comprising one or more amino acid substitutions selected from the group consisting of: Ser302, Met309, Leu322, Ala346, Gly348, Val401, Thr417, and Gly419. In one embodiment, the *Methanosarcina mazei* pyrrolysyl-tRNA synthetase comprises a polypeptide of SEQ ID NO: 2, or a variant thereof. Variants of a selected amino acid sequence, as used herein, include truncations, deletions, insertions, and substitutions of the selected sequence. Variants will further include proteins that are at least 80%, at least 85%, at least 90%, or at least 95% identical to the enumerated sequence. In one embodiment, the invention comprises SEQ ID NO: 2 or a variant thereof which has the ability to charge a tRNA with a phosphorylated tyrosine precursor amino acid, for example, (S)-4-(2-amino-2-carboxyethyl)phenyl 2-nitrobenzyl phosphate.

In another embodiment, the aminoacyl tRNA synthetase can be a mutant form of the *Methanosarcina barkeri* pyrrolysyl-tRNA synthetase, as known in the art, for example, as specified by Uniprot Accession Numbers Q46E77, Q6WRH6, A0A0G3CC06, or A0A0E3QQZ0. In one embodiment, the mutant is a *Methanosarcina barkeri* pyrrolysyl-tRNA synthetase (or variant thereof) comprising one or more amino acid substitutions selected from the group consisting of: Ser267, Met274, Leu287, Ala311, Gly313, Val366, Thr382, and Gly384. In one embodiment, the invention comprises SEQ ID NO: 3 or a variant thereof which has the ability to charge a tRNA with a phosphorylated tyrosine precursor amino acid, for example, (S)-4-(2-amino-2-carboxyethyl)phenyl 2-nitrobenzyl phosphate.

The mutant aminoacyl tRNA synthetase will be utilized in the expression system with a compatible tRNA, which such tRNA is capable of being charged with a phosphotyrosine precursor and which is competent for the incorporation of the phosphotyrosine precursor into a protein during translation.

In one embodiment, the tRNA is the *Methanosarcina mazei* pyrrolysyl-tRNA, as known in the art. In another embodiment, the tRNA is the *Methanosarcina barkeri* pyrrolysyl-tRNA, as known in the art. These tRNAs will incorporate their amino acids at the amber stop codon, TAG. Other tRNAs that may be used include the tRNA$^{M15}$ and other tRNAs described in Serfling et al., 2018 "Designer tRNAs for efficient incorporation of non-canonical amino acids by the pyrrolysine system in mammalian cells", Nuc. Acids Res. 46(1):1-10.

Engineered Expression Systems. The scope of the invention encompasses an engineered protein expression system comprising a tRNA-aminoacyl tRNA synthetase pair, as described above. The expression system may comprise any expression system, including, for example, bacterial, yeast, plant, and mammalian expression systems known in the art. The expression system may comprise a cell-free protein synthesis system, for example a cell lysate-based cell free protein synthesis system.

The engineered protein expression system may comprise cells (or the lysates of such cells), wherein the cells are engineered to express a mutant aminoacyl tRNA synthetase and tRNA pair capable of incorporating phosphorylated tyrosine precursors into a protein.

For example, in one embodiment, the expression vector comprises an *E. coli* expression vector. In other embodiments, the expression vector may comprise a yeast, plant, or mammalian expression system. For example, the expression systems may comprise *Escherichia coli* S30, rabbit reticulocyte, or wheat germ expression systems.

In one embodiment, the engineered expression system comprises a cell expressing a mutant *Methanosarcina mazei* pyrrolysyl-tRNA synthetase and a compatible tRNA. In one embodiment, the expression system comprises a cell comprising a nucleic acid sequence that codes for a mutant *Methanosarcina mazei* pyrrolysyl-tRNA synthetase comprising one or more amino acid substitutions selected from the group consisting of Ser302, Met309, Leu322, Ala346, Gly348, Val401, Thr417, and Gly419.

In one embodiment, the cell comprises a cell which expresses the protein of SEQ ID NO: 2 or a variant thereof. In one embodiment, the expression system comprises a cell comprising the nucleic acid sequence of SEQ ID NO: 1 or a variant thereof. In one embodiment, the scope of the invention comprises a nucleic acid construct comprising SEQ ID NO: 1 or a variant thereof. Variants of SEQ ID NO: 1 include truncations, deletions, insertions, and nucleic acid substitutions of the recited sequence. Variants will further include nucleic acid sequences that are at least 80%, at least 85%, at least 90%, or at least 95% identical to SEQ ID NO: 1 and which code for a pyrrolysyl-tRNA synthetase having the ability to charge a tRNA with a phosphorylated tyrosine precursor amino acid, for example, (S)-4-(2-amino-2-carboxyethyl)phenyl 2-nitrobenzyl phosphate.

In an alternative embodiment, the cell comprises nucleic acid sequences coding for a *Methanosarcina barkeri* aminoacyl pyrrolysyl-tRNA synthetase capable of charging a tRNA with a phosphotyrosine precursor. In one embodiment, the cell comprises a nucleic acid sequence coding for the protein of SEQ ID NO: 3 or a variant thereof. In one embodiment, the cell comprises a cell which expresses the protein of SEQ ID NO: 3 or a variant thereof.

In the expression systems of the invention, the tRNA and aminoacyl tRNA synthetase elements may be constitutively expressed, transiently expressed, or inducibly expressed, as desired.

Precursor Protein Synthesis. The expression system is induced to produce a precursor protein, the precursor protein comprising a protein or polypeptide wherein one or more amino acid residues comprises a phosphorylated tyrosine precursor. The expression system is induced by supplying to it constituents and any conditions necessary for production of the precursor protein. The constituents necessary for production of the precursor protein will include: amino acids, including amino acids comprising one or more phosphorylated tyrosine precursors compatible with the tRNA:tRNA synthetase of the expression system; the engineered nucleic acid construct coding for the precursor protein; and any other components necessary for the expression system to produce the precursor protein. The precursor protein will then be produced, incorporating the phosphorylated tyrosine precursor site-specifically at the one or more sites specified by the non-natural codons.

Following protein expression, the precursor protein may be isolated from the protein expression system by relevant methods known in the art. For example, in the case of a cellular expression system, protein isolation may be facilitated by cell lysis. Protein may be isolated by chromatography, electrophoresis, affinity purification techniques, HPLC, or any other techniques known in the art. In one embodiment, the precursor protein comprises a HIS tag and is purified by use of a nickel affinity column or like platforms.

Converting Precursor Protein to Proteins Comprising Site-Specific Phosphorylated Tyrosines. The isolated precursor protein may then be treated utilizing appropriate methods to convert the phosphorylated tyrosine precursors incorporated therein to phosphorylated tyrosine residues.

In one implementation, the phosphorylated tyrosine precursor comprises a phosphorylated tyrosine precursor which converts to a phosphorylated tyrosine under acidic conditions. For example, the treatment may comprise exposure of the precursor protein to a solution having pH between 1-4, for example, exposure for 6-48 hours, at temperatures from 2-25° C., for example, 4° C. or room temperature. For example, exposure to a solution of 0.04 M HCl for 36 hours at room temperature could be utilized. For example, acidic treatment may be used to convert phosphorylated tyrosine precursors comprising a phosphoramidate group, for example, the phosphorylated tyrosine precursor (S)-3-(4(bis (dimethylamino)phosphoryloxy) phenyl)propanoic acid (Tyr(PO(NMe$_2$)$_2$).

In one implementation, the phosphorylated tyrosine precursor comprises a protecting group which converts to a phosphorylated tyrosine under conditions which remove the protecting group. For example, if the protecting group is a light-activated protecting group, the treatment will comprise exposure to the appropriate wavelengths of light to degrade or remove the protecting group. For example, if the phosphorylated tyrosine precursor comprises light-cleavable o-nitrobenzyl groups, exposure to wavelengths of 200-320 nm will result in cleavage of the protecting moiety and formation of a phosphorylated tyrosine.

In one embodiment, the protein extraction and phosphotyrosine conversion steps are merged into a single step, for example, an acid lysis which liberates expressed proteins from the cells comprising the expression system and which also converts the phosphorylated tyrosine precursors to phosphorylated tyrosine residues.

Phosphorylated Proteins. The scope of the invention further encompasses proteins comprising one or more phosphorylated tyrosine residues wherein such proteins were produced using any of the methods or compositions of the invention described herein. The scope of the invention extends to the use of phosphorylated proteins made by the method of the invention in research and clinical contexts.

EXAMPLES

Example 1

Synthesis of a Phosphorylated Tyrosine Precursor Amino Acid

The phosphorylated tyrosine precursor amino acid (Tyr(PO(NMe$_2$)$_2$):

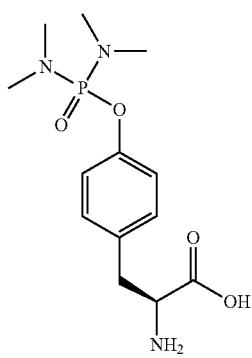 [SMILES: CN(C)P(=O)(Oc1ccc(C[C@H](N)C(=O)O)cc1)N(C)C]

was synthesized as follows: (S)-2-(((9H-fluoren-9-yl)methoxy)carbonylamino)-3-(4(bis(dimethylamino)phosphoryloxy) phenyl)propanoic acid (250 mg, 0.46 mmol) was dissolved in 3 mL 20%-4-methylpiperidine-DMF and stirred at room temperature for 20 min. Subsequently, the reaction mixture was added to cold Et$_2$O. The formed precipitate was removed and dried in vacuo to yield 120 mg (82%) of the final pure product.

Example 2

Evolution of a Mutant Aminoacyl tRNA Synthetase for the Incorporation of Phosphorylated Tyrosine Precursor Amino Acids Into Proteins To genetically encode the phosphorylated tyrosine precursor Tyr(PO(NMe$_2$)$_2$ into proteins, the *Methanosarcina mazei* tRNA$_{CUA}^{Pyl}$/PylRS pair was evolved to be specific for this unnatural amino acid. A mutant library of PylRS was generated with multiple residues: 302, 309, 322, 346, 348, 401, 417, and 419 being mutated as previously described in Hoppmann, C., Lacey, V. K., Louie, G. V., Wei, J., Noel, J. P. & Wang, L. Genetically Encoding Photoswitchable Click Amino Acids in *Escherichia coli* and Mammalian Cells. *Angew. Chem. Int. Ed. Engl.* 53, 3932-3936 (2014). From this library, one round of positive selection identified a clone showing phenotypic dependence on Tyr(PO(NMe$_2$)$_2$. DNA sequencing revealed that this clone carried a mutant PylRS with amino-acid identities Ser302, Gly309, Pro322, Ala346, Gly348, Gly384, Ala401, Gly417, and Ala419, as in SEQ ID NO: 2, which was named as MmNpYRS.

To investigate the efficiency and fidelity of the evolved MmNpYRS to incorporate Tyr(PO(NMe$_2$)$_2$, a gene for *Xenopus* calmodulin (CaM_76TAGHis6) that contained an amber stop codon TAG at the permissive Met76 site (and a C-terminal His×6 tag) was expressed in *E. coli* BL21 cells, together with the tRNA$_{CUA}^{Pyl}$/MmNpYRS. Analysis of the expressed CaM protein by electrospray ionization ion trap mass spectrometry confirmed incorporation of Tyr(PO(NMe$_2$)$_2$ into CaM at position 76. In addition, the high fidelity of the evolved MmNpYRS was also confirmed by incorporating Tyr(PO(NMe$_2$)$_2$ into another protein, myoglobin. The incorporation of Tyr(PO(NMe$_2$)$_2$ into proteins in *E. coli* suggests that the WT *E. coli* EF-Tu is compatible with Tyr(PO(NMe$_2$)$_2$-tRNA$_{CUA}^{Pyl}$.

Example 3

Conversion of Precursor Protein to Protein Comprising Phosphorylated Tyrosine Residues To test the cleavage of Tyr(PO(NMe$_2$)$_2$ and the formation of the pTyr within proteins, we treated the CaM solution (0.6 mg mL$^{-1}$) with HCl at a final concentration of 0.4 M (pH~1) for 48 h at 4° C. The protein sample was lyophilized to remove the acid and then dissolved in water. ESI-MS measurements clearly demonstrated the removal of the protecting group and the formation of a pTyr within the CaM.

In another experiment, Tyr(PO(NMe$_2$)$_2$ was incorporated in green fluorescent protein (GFP), which has a larger MW (28 kDa) and a different secondary structure β-sheet compared to the largely helical CaM. A mutant GFP gene containing a TAG codon at the permissive Tyr182 site (GFP_182TAG) and a C-terminal His×6 tag was expressed with the tRNA$_{CUA}^{Pyl}$/MmNpYRS pair in *E. coli* in 2× YT medium. The mutant GFP protein was purified. HCl (final conc. 0.4 M, pH~P1) was added to a diluted (0.1 mg mL$^{-1}$) solution of the purified GFP containing, and the mixture was incubated at 4° C. for 16 h, after which the sample was lyophilized and dissolved in water. Western-blot analysis of the GFP proteins using the anti-His×6 antibody showed that full-length GFP was expressed only in the presence of Tyr(PO(NMe$_2$)$_2$, confirming the specific incorporation of Tyr(PO(NMe$_2$)$_2$ by the tRNA$_{CUA}^{Pyl}$/MmNpYRS.

Example 4

Synthesis of Phosphorylated Ubiquitin

The approach described above was used to generate phosphotyrosine ubiquitin and to investigate the impact of tyrosine phosphorylation on the ubiquitin conformation and function. Phosphorylation of Tyr59, the only tyrosine residue of WT ubiquitin, has been exclusively observed in cancerous tissue but its biological relevance remains unknown. The hydroxyl group of Tyr59 hydrogen bonds with the backbone amide of Glu51, forming a loop that is disrupted by mutation of Tyr59 to other natural amino acids. To provide direct evidence whether phosphorylation of tyrosine 59 alters the Y59-E51 loop in ubiquitin and ubiquitin function, Tyr(PO(NMe$_2$)$_2$ was incorporated into ubiquitin at position 59, as above, and the phosphotyrosine was generated by acid cleavage followed by lyophilization. SDS-PAGE in combination with ESI-MS spectroscopic investigations confirmed the successful preparation of pTyr59 ubiquitin.

A conformation change was induced by pTyr59, as confirmed by HSQC NMR spectra of WT ubiquitin and the phosphorylated ubiquitin. To investigate whether the pTyr59 in ubiquitin would interfere with thioester formation between ubiquitin and its E2 conjugating enzyme, the conjugation of the generated phosphorylated ubiquitin to the E2 enzyme UBE2D3 was studied. The phosphorylated ubiquitin showed dramatically decreased formation of the Ub-E2 conjugate, indicating that the phosphorylation of tyrosine 59 disturbs the conformation of ubiquitin and its ability to conjugate to the E2 enzyme UBE2D3, suggesting that Tyr59 phosphorylation on ubiquitin could play negative regulation in the ubiquitination process.

In summary, the results demonstrate a novel method to prepare phosphorylated proteins with phosphotyrosine site-specifically introduced. Combining genetic incorporation with facile pH conversion, this method enables phosphotyrosine to be introduced at different secondary structures of various proteins with broad compatibility of protein type, size, and phosphorylation site. The method produces phosphorylated proteins in high quality and excellent yields.

All patents, patent applications, and publications cited in this specification are herein incorporated by reference to the same extent as if each independent patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

What is claimed is:

1. A mutant aminoacyl tRNA synthetase, comprising
   (a) a mutant *Methanosarcina mazei* pyrrolysyl-tRNA synthetase having a sequence with at least 95% identity to SEQ ID NO: 2 and comprising serine at amino acid position 302, methionine at amino acid position 309, leucine at amino acid position 322, alanine at amino acid position 346, glycine at amino acid position 348, and threonine at amino acid position 417; or
   (b) a mutant *Methanosarcina barkeri* pyrrolysyl-tRNA synthetase having a sequence with at least 95% identity to SEQ ID NO: 3 and comprising serine at amino acid position 267, methionine at amino acid position 274, leucine at amino acid position 287, alanine at amino acid position 311, glycine at amino acid position 313, and threonine at amino acid position 382.

2. The mutant aminoacyl tRNA synthetase of claim 1, wherein
   the mutant aminoacyl tRNA synthetase is the mutant *Methanosarcina mazei* pyrrolysyl-tRNA synthetase having a sequence with at least 95% identity to SEQ ID NO: 2 and comprising serine at amino acid position 302, methionine at amino acid position 309, leucine at amino acid position 322, alanine at amino acid position 346, glycine at amino acid position 348, and threonine at amino acid position 417.

3. The mutant aminoacyl tRNA synthetase of claim 1, wherein
   the mutant aminoacyl tRNA synthetase is the mutant *Methanosarcina barkeri* pyrrolysyl-tRNA synthetase having a sequence with at least 95% identity to SEQ ID NO: 3 and comprising serine at amino acid position 267, methionine at amino acid position 274, leucine at amino acid position 287, alanine at amino acid position 311, glycine at amino acid position 313, and threonine at amino acid position 382.

4. The mutant aminoacyl tRNA synthetase of claim 1, wherein the mutant aminoacyl tRNA synthetase is expressed in a cell.

5. The mutant aminoacyl tRNA synthetase of claim 4, wherein the cell is any of a bacterial, yeast, plant, or mammalian cell.

* * * * *

SEQUENCE LISTING

```
Sequence total quantity: 3
SEQ ID NO: 1              moltype = DNA  length = 1365
FEATURE                   Location/Qualifiers
misc_feature              1..1365
                          note = mutant pyrrolysyl-tRNA synthetase
source                    1..1365
                          mol_type = other DNA
                          organism = Methanosarcina mazei
SEQUENCE: 1
atggataaaa agcctctgaa cactctgatt tctgcgaccg gtctgtggat gtcccgcacc   60
ggcaccatcc acaaaatcaa acaccatgaa gttagccgtt ccaaaatcta cattgaaatg  120
gcttgcggcg atcacctggt tgtcaacaac tcccgttctt ctcgtaccgc tcgcgcactg  180
cgccaccaca aatatcgcaa aacctgcaaa cgttgccgtg ttagcgatga agatctgaac  240
aaattcctga ccaaagctaa cgaggatcag acctccgtaa aagtgaaggt agtaagcgct  300
ccgacccgta ctaaaaaggc tatgccaaaa agcgtggccc gtgccccgaa acctctggaa  360
aacaccgagg cggctcaggc tcaaccatcc ggttctaaat tttctccggc gatcccagtg  420
tccacccaag aatctgtttc cgtaccagca agcgtgtcta ccagcattag cagcatttct  480
accggtgcta ccgcttctgc gctggtaaaa ggtaacacta cccgattac tagcatgtct  540
gcaccggtac aggcaagcgc cccagctctg actaaatccc agacggaccg tctggaggtg  600
ctgctgaacc caaggatga aatctctctg aacagcggca agccttccg tgagctggaa  660
agcgagctgc tgtctcgtcg taaaaaggat ctgcaacaga tctacgctgg ggaacgcgag  720
aactatctgg gtaagctgga gcgcgaaatt actcgcttct tcgtggatcg cggtttcctg  780
gagatcaaat ctccgattct gattccgctg aatacattg aacgtatggg catcgataat  840
gataccgaac tgtctaaaca gatcttccgt gtggataaaa acttctgtct gcgtccgatg  900
ctgtctccga acctgtacaa ctatatgcgt aaactggacc gtgccctgcc ggacccgatc  960
aaattgttcg agatcggtcc ttgctaccgt aaagagtccg acggtaaaga gcacctggaa 1020
gaattcacca tgctggcttt cggtcagatg ggtagcggtt gcacgcgtga aaacctggaa 1080
tccattatca ccgacttcct gaatcacctg ggtatcgatt tcaaaattgt tggtgacagc 1140
tgtatggtgt atggcgatac gctggatgtt atgcacggcg atctggagct gtcttccgca 1200
gttgtgggcc caatcccgct ggatcgtgag tggggtatcg acaaacctac gatcggtgcg 1260
ggttttggtc tggagcgtct gctgaaagta aaacacgact tcaagaacat caaacgtgct 1320
gcacgttccg agtcctatta caatggtatt tctactaacc tgtaa                 1365

SEQ ID NO: 2              moltype = AA  length = 454
FEATURE                   Location/Qualifiers
REGION                    1..454
                          note = mutant pyrrolysyl-tRNA synthetase
source                    1..454
                          mol_type = protein
                          organism = Methanosarcina mazei
SEQUENCE: 2
MDKKPLNTLI SATGLWMSRT GTIHKIKHHE VSRSKIYIEM ACGDHLVVNN SRSSRTARAL   60
RHHKYRKTCK RCRVSDEDLN KFLTKANEDQ TSVKVKVVSA PTRTKKAMPK SVARAPKPLE  120
NTEAAQAQPS GSKFSPAIPV STQESVSVPA SVSTSISSIS TGATASALVK GNTNPITSMS  180
APVQASAPAL TKSQTDRLEV LLNPKDEISL NSGKPFRELE SELLSRRKKD LQQIYAEERE  240
NYLGKLEREI TRFFVDRGFL EIKSPILIPL EYIERMGIDN DTELSKQIFR VDKNFCLRPM  300
LSPNLYNYMR KLDRALPDPI KLFEIGPCYR KESDGKEHLE EFTMLAFGQM GSGCTRENLE  360
SIITDFLNHL GIDFKIVGDS CMVYGDTLDV MHGDLELSSA VVGPIPLDRE WGIDKPTIGA  420
GFGLERLLKV KHDFKNIKRA ARSESYYNGI STNL                              454

SEQ ID NO: 3              moltype = AA  length = 419
FEATURE                   Location/Qualifiers
REGION                    1..419
                          note = mutant pyrrolysyl-tRNA synthetase
source                    1..419
                          mol_type = protein
                          organism = Methanosarcina barkeri
SEQUENCE: 3
MDKKPLDVLI SATGLWMSRT GTLHKIKHHE VSRSKIYIEM ACGDHLVVNN SRSCRTARAF   60
RHHKYRKTCK RCRVSDEDIN NFLTRSTESK NSVKVRVVSA PKVKKAMPKS VSRAPKPLEN  120
SVSAKASTNT SRSVPSPAKS TPNSSVPASA PAPSLTRSQL DRVEALLSPE DKISLNMAKP  180
FRELEPELVT RRKNDFQRLY TNDREDYLGK LERDITKFFV DRGFLEIKSP ILIPAEYVER  240
MGINNDTELS KQIFRVDKNL CLRPMLSPTL YNYMRKLDRI LPGPIKLFEV GPCYRKESDG  300
KEHLEEFTMV AFGQMGSGCT RENLEALIKE FLDYLEIDFE IVGDSCMVYG DTLDIMHGDL  360
ELSSAVVGPV SLDREWGIDK PTIGAGFGLE RLLKVMHGFK NIKRASRSES YYNGISTNL   419
```